INVENTOR.
GORDON H. MAY
BY Robert B. Crouch
ATTORNEY

United States Patent Office 3,328,195
Patented June 27, 1967

3,328,195

MAGNETIC RECORDING MEDIUM WITH TWO STORAGE LAYERS FOR RECORDING DIFFERENT SIGNALS

Gordon H. May, San Jose, Calif., assignor to International Business Machines Corporation, New York, N.Y., a corporation of New York Continuation of application Ser. No. 241,196, Nov. 30, 1962. This application June 24, 1966, Ser. No. 560,348
3 Claims. (Cl. 117—69)

This application is a continuation of application Ser. No. 241,196, filed Nov. 30, 1962, now abandoned.

The present invention relates to a magnetic recording medium for data storage and more particularly to a magnetic recording medium which has a greatly increased magnetic data storage capacity.

In magnetic data storage devices, one or more transducers and a storage medium are supported in proximity to each other for relative movement. Electrical signals applied to the transducer are stored in the storage medium in the form of minute areas of magnetic flux concentration. Each storage medium has a fixed available surface area in which data may be recorded and the capacity of which, for a given record density, remains constant. The continuing demand for larger storage capacities in magnetic data storage devices has heretofore been met by increasing the available surface area of magnetic medium within the devices. This approach has successfully produced an increase in storage capacity, but only with a corresponding increase in the bulk of the overall device.

The object of the present invention is to provide a magnetic recording medium having approximately double the usual storage capacity without any coresponding increase in surface area or bulk.

The above object is realized in the present invention by provision of a dual magnetic-layer medium in which two distinct layers of magnetic material are superimposed on a non-magnetic substrate. With this medium, different sets of data can be recorded in the two layers to approximately double the storage capacity of the medium.

Figure 1:
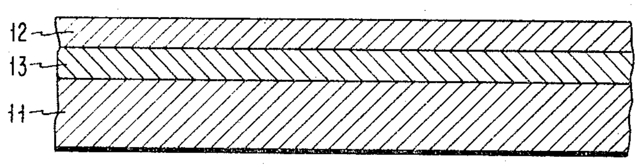
Figure 2:
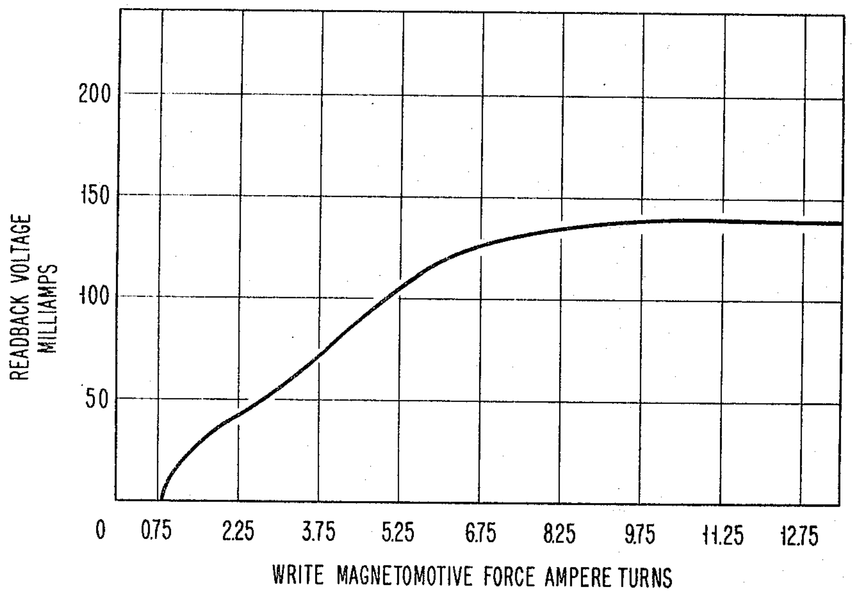

The foregoing and other objects, features and advantages of the invention will be apparent from the following more particular description of a preferred embodiment of the invention, as illustrated in the accompanying drawing wherein;

FIG. 1 is a partial elevation view in section of a magnetic recording medium according to the present invention, and FIG. 2 is a plot of the magnetic characteristic of a typical recording medium according to this invention.

As shown in FIG. 1, the magnetic recording medium of the present invention includes a supporting substrate 11 and two distinct layers, 12 and 13, of magnetic material of different coercivities superimposed on the substrate. The substrate 11 is of non-magnetic material, such as aluminum, brass, etc., while upper layer 12 and lower layer 13 are of any suitable material such as nickel-cobalt, magnetic iron oxide, etc. With this construction, one set of signals can be recorded in the upper layer 12 and a different set of signals recorded directly underneath in the lower layer 13. To make this dual layer recording effective, the two sets of signals must be individually recognizable and one must exist independently of the other. To be individually recognizable the frequencies at which the two sets of signals are recorded must be sufficiently distinct to allow the two to be separated by filtering. This requirement can be met by recording the set of signals in the upper layer at a high frequency, approximately three or four times the frequency of the other set of signals recorded in the lower layer. In addition, so that one set of signals may exist independently of the other, the coercivity of the lower layer must be considerably greater than that of the upper layer. This is to allow the set of signals recorded on the lower layer to remain undisturbed by subsequent writing and rewriting of the set of signals in the upper layer. The particular ratio of coercivities between the two layers will depend to some degree upon the types of information to be recorded, since the greater the ratio of coercivities the more indelible the lower layer becomes. In a given case, the minimum effective ratio is approximately 5 to 1 whereas 8–10 to 1 would be a nominal ratio.

Referring to FIG. 2 of the drawing, the saturation characteristic of a typical dual layer disk has been determined by writing with square wave current of varying amplitude at a constant frequency and then measuring the amplitude of the readback voltage. The medium tested included an upper layer 30 microinches thick with a coercivity of 130 oersteds while the lower layer was 180 microinches in thickness with a coercivity of 1000 oersteds. As shown on the graph, the upper layer of the medium saturated at approximately 1.2 ampere turns while the lower layer saturated at approximately 6.75 ampere turns. A linear region of the lower layer is found between 1.5 ampere turns and 6.0 ampere turns. With proper D.C. biasing a low frequency signal may be linearly recorded in the lower layer while a frequency signal is saturate recorded in the upper layer. The lower layer should be written at a frequency or at a band of frequencies whose upper limit is well below the lowest frequency contained in the upper layer. The saturation characteristics of the upper and lower layers can be used to determine the write and erase currents which would have a minimum effect on the information recording of the lower layer.

The low frequency information to be recorded in the lower layer may be written during manufacture of the medium prior to the application of the upper layer. This would be particularly advantageous in the case where the low frequency information was meant to be permanently recorded. If it is desired however, the low frequency information may be written through the upper layer after the medium is manufactured. In this case, a large magnetomotive force, i.e., in the order of 5 ampere turns for the transducer and lower layer coercivity tested above, would be necessary for this purpose.

The present invention is applicable to various type magnetic recording media such as a drum, disk tape, etc. The layers of magnetic material may be applied by any suitable process, e.g. electroplating, spraying, painting, etc.

While the invention has been particularly shown and described with reference to a preferred embodiment thereof, it will be understood by those skilled in the art that the foregoing and other changes in the form and details may be made therein without departing from the spirit and scope of the invention.

What I claim is:

1. A magnetic data recording medium comprising:
a non magnetic substrate, and
means for storing simultaneously a plurality of different sets of magnetic information signals, said means including
a first signal storage layer of high coercivity magnetic material applied directly on the substrate for storage of a first set of relatively low frequency magnetic signals,
and a second signal storage layer of low coercivity magnetic material applied directly on the first layer for storage of a second set of relatively high frequency magnetic signals, the coercivity of the first layer being a minimum of five times that of the second layer.

2. A magnetic data recording medium as set forth in claim 1 in which the first signal storage layer is considerably thicker than the second signal storage layer and the frequency of the second set of magnetic signals is approximately three times that of the first set.

3. A magnetic data recording medium as set forth in claim 1 in which the ratio of coercivities of the two signal storage layers is normally 8–10 to one.

References Cited

UNITED STATES PATENTS

| | | | |
|---|---|---|---|
| 2,643,130 | 6/1953 | Kornei | 274—41.4 |
| 2,647,954 | 8/1953 | Howell | 179—100.2 |
| 2,691,072 | 10/1954 | Mathes | 179—100.2 |
| 2,941,901 | 6/1960 | Prill et al. | 117—76 |
| 3,052,567 | 9/1962 | Gabor et al. | 117—76 |

| | | | |
|---|---|---|---|
| 3,131,078 | 4/1965 | Fuller et al. | 117—8 |
| 3,171,754 | 3/1965 | Smaller | 117—71 |
| 3,185,971 | 5/1965 | Brette et al. | 346—74 X |
| 3,219,353 | 11/1965 | Prentky | 274—41.4 |
| 3,255,033 | 6/1966 | Schmeckenbecher | 117—47 |
| 3,268,353 | 8/1966 | Melillo | 117—69 |

OTHER REFERENCES

Soohoo, Ronald F.: "Magnetic Thin Films," Harper & Row, N.Y. (1965), QC 161 S 65C.2 pages 143–5.

Scientific Report No. 1., Contract AF 19 (604)–4978, "Thin Ferromagnetic Films" (1960), pages 9–10.

WILLIAM D. MARTIN, *Primary Examiner.*

W. D. HERRICK, *Assistant Examiner.*